Sept. 7, 1937.  H. M. NIELSEN  2,092,653

TRANSFERRING LOCATION

Filed July 24, 1936

INVENTOR.
Harry M. Nielsen
BY Barnes, Kisselle, Laughlin & Raisch
ATTORNEY.

Patented Sept. 7, 1937

2,092,653

UNITED STATES PATENT OFFICE 2,092,653

TRANSFERRING LOCATION

Harry M. Nielsen, Berkley, Mich.

Application July 24, 1936, Serial No. 92,358

9 Claims. (Cl. 77—62)

This invention relates to the transferring of locations from one machine element to another, and particularly to locations where apertures or holes are to be provided for the reception of cap screws, bolts, or the like.

In the manufacture of dies or parts thereof or in machine construction, it is often necessary to fasten one part onto another by the use of blind tapped recesses, or in other words by cap screws or the like where the screws do not go entirely through one element. In many instances the locations where the holes are to be drilled must be very accurately determined.

The object of the present invention is to provide an improved procedure and improved transfer screw structure for transferring the hole locations from one machine element to another. A further object is the provision of an arrangement whereby a plurality of locations may be transferred at one time, so that the transfer of individual locations is not only accurate with respect to the tool machine parts, but the several locations are accurately located relative to each other. The invention and its objects will be better appreciated as the following detailed description is considered in connection with the accompanying drawing.

Figure 1:
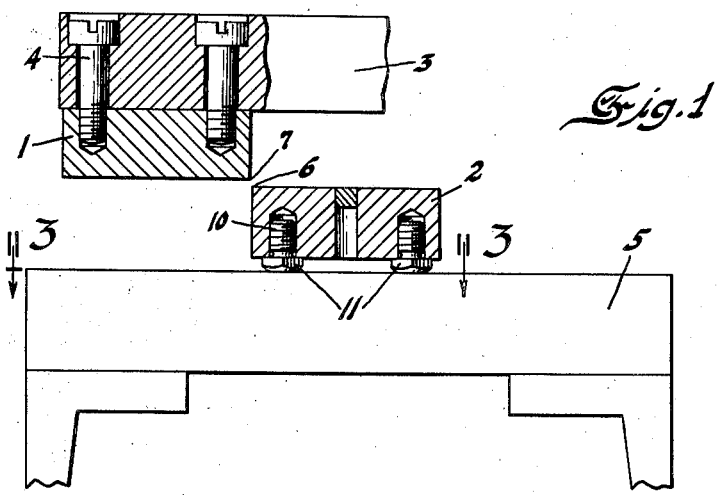
Fig. 1 is a cross sectional view taken through a cutting die and illustrating the use of the transfer structure.
Figure 2:
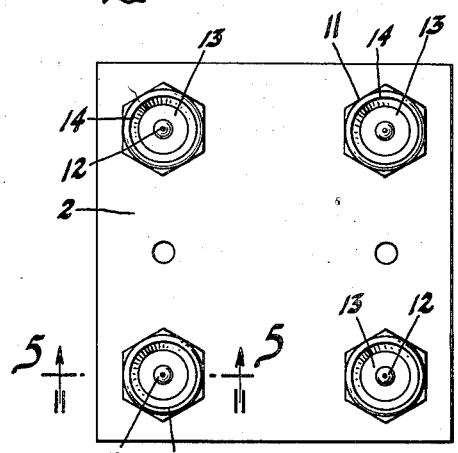
Fig. 2 is a plan view of a machine element with transfer screws secured thereto.
Figure 4:
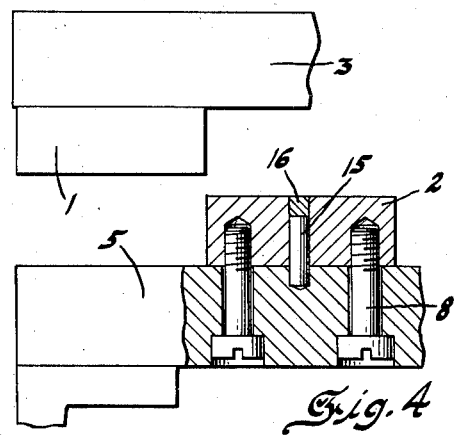
Fig. 4 is a view partly in section illustrating a complete structure.

As shown in Fig. 1 there is a cutting die which embodies two members, 1 and 2. One member, namely, member 1, is suitably mounted to support 3, which may be movable, as by means of suitable screws as shown at 4. The other member 2 is to be mounted upon the base or support 5. However, the upper surface of the member 2 preferably should be smooth and not interrupted or marred by the drilling of holes therethrough, as the work to be acted upon by the dies must pass over this member. On the other hand the member 2 must be very accurately located on the base 5 in order to bring its effective edge 6 in proper relation with the cooperating edge 7 of the die member 1. In order that the surface of the member 2 be not interfered with it is preferable to mount the member as illustrated in Fig. 4, or in some similar manner where the same is shown as being mounted to the base by suitable screws 8, which may be cap screws or the so-called Allen screw.

The difficulty which presents itself is that of accurately locating the member 2 as it will be appreciated that the tapped recesses of the member 2 must be very accurately aligned with the bores for the screws in the base 5 and the bores in the base must be accurately located. To accurately locate the member 2 this die member is first drilled out and tapped with the appropriate or desired number of recesses. Next, the base 5 has to be drilled through for the reception of the screws. The difficulty is of locating spots on the base 5 where the same is to be drilled.

Figure 5:
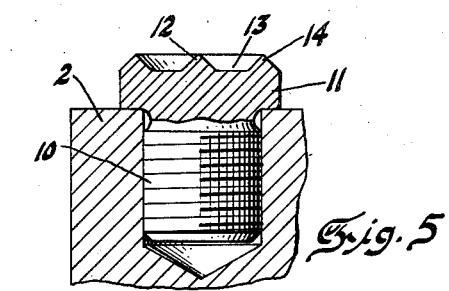
Fig. 5 is an enlarged cross sectional view illustrating a transfer screw in position.

To meet this situation the invention provides a transfer screw, a plurality of which may be used simultaneously. Such a screw is shown in Fig. 5. It has a screw threaded body 10 and a head 11. The heads 11 of the screws of a given size are all of uniform dimension measured axially. Each head of the screw is formed preferably with a central point locator, as illustrated at 12 surrounded by a recess 13 and a circular ridge or rib 14. The heads are preferably arranged so that a wrench may be applied thereto.

Figure 3:
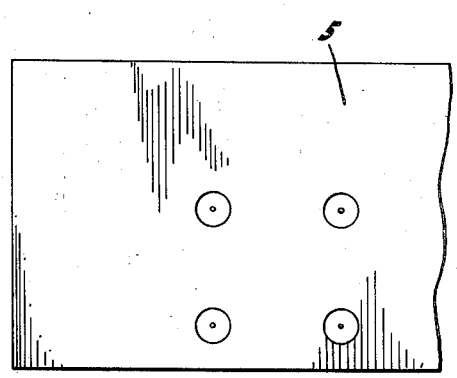
Fig. 3 is a plan view of the base of a die or other machine element illustrating the marking obtained in the transfer action.

In setting up the die, the die member 1 may first be secured in position and die member 2 may be drilled out and tapped according to the number of screws to be used. A number of transfer screws are now employed, one for each drilled and tapped aperture, and they are screwed down tightly in the apertures. When the transfer screws are screwed home with their heads against the surface of the member 2, they all lie in the same plane. The member 2 is now placed upon the member 5 and accurately located relative to the member 1 as illustrated in Fig. 1. The member 2 may now be given a blow with a suitable instrument, and the center finder or point 12 and the sharp ridge 14 mark into the base 5 the locations as shown in Fig. 3. The center point is for the center of rotation, while the circle shows the periphery of the hole to be drilled. The base 5 is now drilled with suitable apertures as shown in Fig. 4. These are accurately located relative to the prior tapped apertures in the die piece 2. The die piece 2 may now be securely fastened to the support 5 by the screws as shown in Fig. 4. Usually the holes in the base 5 are drilled slightly larger than the screws to be used; for example, where a half inch screw is used a hole of $^{17}/_{32}$ may be employed; where a ¼ inch cap screw is used a hole of $^{17}/_{64}$ may be employed; and where a ⅝ inch screw is used a hole of $^{21}/_{32}$ may be employed. Obviously, the transfer screws will be supplied in these different sizes corresponding to the size of screw to be used in holding the parts together.

The transfer screws are preferably made of metal capable of long use, as for example, tool steel, or a lower grade of steel case hardened. If desirable the member 2 may be further accurately located by the use of one or more dowel pins as shown at 15, in which event the apertures for the dowel pins may be filled in with metal as shown at 16 and smoothed off to correspond with the surface. This is probably desirable in many instances where especially accurate work is required, as in dies, due to the fact that the apertures for the screws are somewhat oversize.

It is feasible to employ the invention in a construction where the center point 12 is omitted and merely the circle indicated. It is likewise feasible to employ the invention where the center finder 12 is used and the circle finder omitted. However, it is preferred that both the center point and the circle point be employed. It is also to be noted that the point 12 and the circle finding ridge 14 lie in the same plane or substantially the same plane, it being the object principally to keep the center point 12 from projecting beyond the plane of the ridge. With such a construction the block 2 with the transfer screw in place may be easily adjusted by sliding the same across the base 5. If the center point 12 projected beyond the circle finding ridge the point would more or less bite into the member 5, perhaps scratch the surface thereof as the member 2 is moved around and adjusted, and this would make it more difficult to shift the member 2 in adjustment.

It is appreciated that various marking devices have heretofore been used. Some take the form of a punch to be held in the hand and arranged to mark a location on the work when it is given a blow, and some are in the nature of hand operated tools arranged to be applied to the work by hand, and some provide the center marking as well as a circle marking. However, this is an entirely different idea and the devices are not designed for and cannot be used for the finding or locating of blind screw holes. While the invention has been described in connection with the dies, and only a simple die structure shown, it is to be appreciated that the invention may be used in any sort of machine construction where a member such as the member 2 is to be fastened to another such as a member 5 by the use of blind screws, and where it is desired to have an accurate location.

I claim:
1. A transfer screw for finding locations for the drilling of holes for screws or the like comprising, a member having a screw threaded body adapted to be screwed into a tapped hole in a machine element, said screw having a head adapted to be abutted against the surface of the machine element when the transfer screw is turned home, said head having a determined axial dimension, the top surface of the head having a central projection and a surrounding circular ridge adapted to mark the center point and circle of a hole to be drilled in another machine element.

2. A transfer screw for finding locations for the drilling of holes for screws or the like comprising, a member having a screw threaded body adapted to be screwed into a tapped hole in a machine element, said screw having a head adapted to be abutted against the surface of the machine element when the transfer screw is turned home, said head having a determined axial dimension, the top surface of the head having a central projection and a surrounding circular ridge adapted to mark the center point and circle of a hole to be drilled in another machine element, the determined axial dimension of the head permitting placement of a plurality of said transfer screws in tapped apertures, whereby a plurality of locations may be simultaneously marked on the said other machine elements.

3. A transfer screw for finding locations for the drilling of holes for screws or the like comprising a member having a screw threaded body adapted to be screwed into a tapped hole in a machine element, said screw having a head adapted to be abutted against the surface of the machine element when the transfer screw is turned home, said head having a determined axial dimension, the top surface of the head having a central projection and a surrounding circular ridge adapted to mark the center point and circle of a hole to be drilled in another machine element, said center point and said circular ridge lying substantially in the same plane.

4. A transfer screw for finding locations for the drilling of holes for screws or the like comprising, a member having a screw threaded body adapted to be screw into a tapped hole in a machine element, said screw having a head adapted to be abutted against the surface of the machine element when the transfer screw is turned home, said head having a determined axial dimension, the top surface of the head having a central projection and a surrounding circular ridge adapted to mark the center point and circle of a hole to be drilled in another machine element, said center point and said circular ridge lying substantially in the same plane, and said head having a recess surrounding the center point and lying within the circular ridge.

5. A transfer screw for finding locations for the drilling of holes for screws or the like comprising a member having a screw threaded body adapted to be screwed into a tapped hole in a machine element, said screw having a head adapted to be abutted against the surface of the machine element when the transfer screw is turned home, said head having a determined axial dimension, the top surface of the head having a central projection thereon which constitutes a finder adapted to mark the center point of a hole to be drilled in another machine element.

6. A transfer screw for finding locations for the drilling of holes for screws or the like comprising, a member having a screw threaded body adapted to be screwed into a tapped hole in a machine element, said screw having a head adapted to be abutted against the surface of the machine element when the transfer screw is turned home, said head having a determined axial dimension, the top surface of the head having a central ridge concentrically disposed relative to the body of the screw and adapted to mark the circle of a hole to be drilled in another machine element.

7. The method of transferring a plurality of locations for the drilling of holes for screws or the like for the attachment of one machine element to another machine element which comprises, forming blind screw holes in one machine element, placing into each hole a transfer device, and said devices having heads of uniform axial dimension and each head having on its top surface a formation for marking a location on the second machine element, seating each head against the surface of said one machine element whereby said marking formations are accurately positioned relative to said machine element, placing the first machine element on the second machine element with the heads of the transfer devices lying against the second machine element, accurately positioning two machine elements in the relative positions in which they are to be attached to each other, striking one machine element to cause the heads to mark locations on the second machine element, drilling holes through the second machine element at the marked locations, removing the transfer devices, then uniting the two machine elements by screws or the like passing through the holes in the second machine elements and into the blind holes in the first machine element.

8. The method of transferring a plurality of locations for the drilling of holes for screws or the like for the attachment of one machine element to another machine element which comprises, forming blind screw holes in one machine element, placing into each hole a transfer device, and said devices having heads of uniform axial dimension and each head having on its top surface a central marking point and a concentric ridge surrounding the same, seating each head against the surface of the said one machine element whereby the points and ridges lie in the same plane, placing the first machine element on the second machine element with the heads of the transfer devices lying against the second machine element, accurately positioning two machine elements in the relative positions in which they are to be attached to each other, striking one machine element to cause the heads to mark locations on the second machine element, drilling holes through the second machine element at the marked locations, removing the transfer screws, then uniting the two machine elements by screws or the like passing through the holes in the second machine element and into the blind holes in the first machine element.

9. A transfer device for finding locations for the drilling of holes for screws or the like comprising, a member having a body adapted to be inserted into a hole in a machine element, said member having a head adapted to be abutted against the surface of the machine element, said head having a determined axial dimension whereby a plurality of said members may be thus positioned in a machine element with the top surfaces of the heads thereof accurately positioned relative to said machine element, and the top surface of the head having a marking formation thereon which constitutes a finder and which is adapted to mark the location of a hole to be drilled in another machine element.

HARRY M. NIELSEN.